Aug. 16, 1955        I. L. SAVESON        2,715,286

MOLE DRAINER AND SUBSOILING PLOW

Filed Feb. 3, 1953        2 Sheets-Sheet 1

INVENTOR
I. L. SAVESON

BY R. Hoffman

ATTORNEY

Aug. 16, 1955     I. L. SAVESON     2,715,286
MOLE DRAINER AND SUBSOILING PLOW
Filed Feb. 3, 1953     2 Sheets-Sheet 2
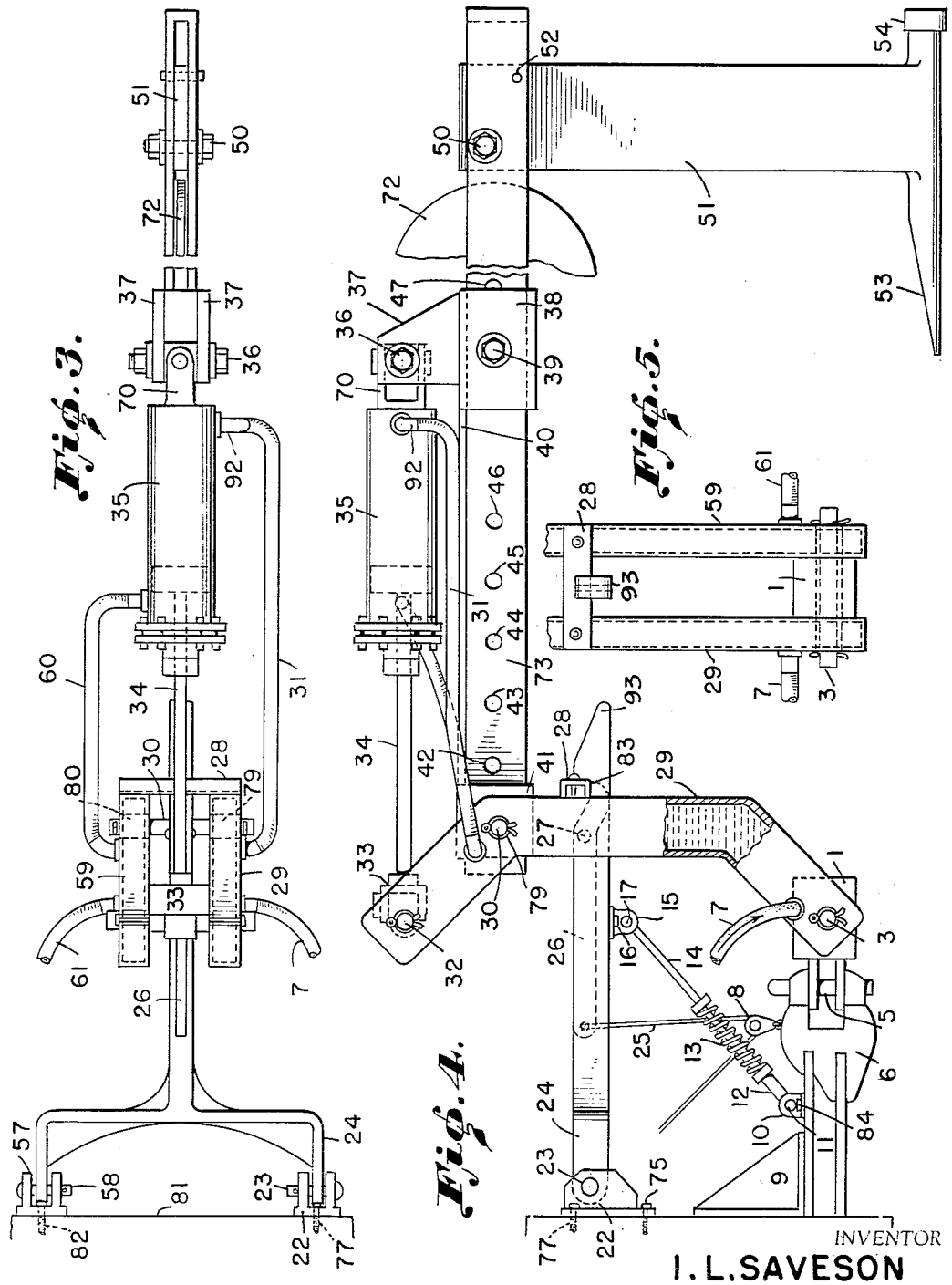
INVENTOR
I. L. SAVESON
BY R. Hoffman
ATTORNEY

United States Patent Office 2,715,286
Patented Aug. 16, 1955

2,715,286

MOLE DRAINER AND SUBSOILING PLOW

Irwin L. Saveson, Baton Rouge, La., assignor to the United States of America as represented by the Secretary of Agriculture Application February 3, 1953, Serial No. 334,991

7 Claims. (Cl. 37—193)

(Granted under Title 35, U. S. Code (1952), sec. 266)

A non-exclusive, irrevocable, royalty-free license in the invention herein described, for all governmental purposes, throughout the world, with the power to grant sublicenses for such purposes, in hereby granted to the Government of the United States of America.

This invention relates to a machine for making artificial drainage channels below the surface of the soil. These artificial channels are generally known as mole drains. The machine has further use for subsoiling by using a standard chisel point to shatter the soil below the surface.

The machine in use is suspended from and drawn by a tractor. Such machines have been made in the past, but all have suffered from the disadvantage that they were unable to bridge small depressions in the field, but would transmit them to the mole drain.

One object of the invention, therefore, is to provide a mole drainage and subsoiling machine of a floating type capable of being suspended from and drawn by a tractor, and which will bridge small depressions in the soil without transmitting such depressions to the channel.

Another object of the invention is to provide a mechanism which can be completely suspended from the rear of the tractor to facilitate turning the machine and starting mole drains from outlet ditches of limited accessibility.

Another object is to provide a machine of flexible design, flexible operation, and a wide range of adjustments for making mole channels or subsoil under varying conditions of topography, soil texture, and soil moisture.

Another object of the invention is to provide an hydraulic mechanism for operating the machine.

Another object of the invention is to provide a machine that can be adjusted to operate at various depths while it is in operation and being pulled by a tractor.

With the foregoing objectives in mind, the invention will now be described in detail. Similar numerals refer to similar parts throughout the several views.

Figure 3 is a plan view showing details of structure.

Figure 4 is a side elevation including a portion of the tractor to which the invention is attached. As shown, the machine is in a latched position suspended from the tractor.

Figure 5 is a rear elevation of the latch.

Figure 1:
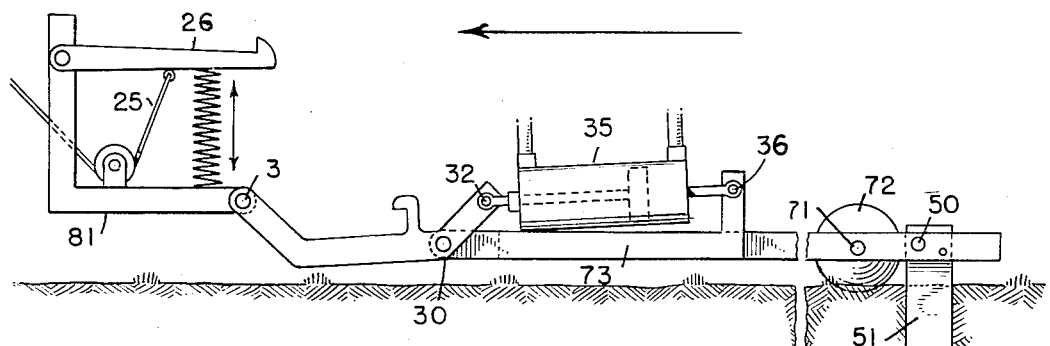
Figure 1 is a schematic representation of the machine in its operating position while being drawn by a tractor.
Figure 2:
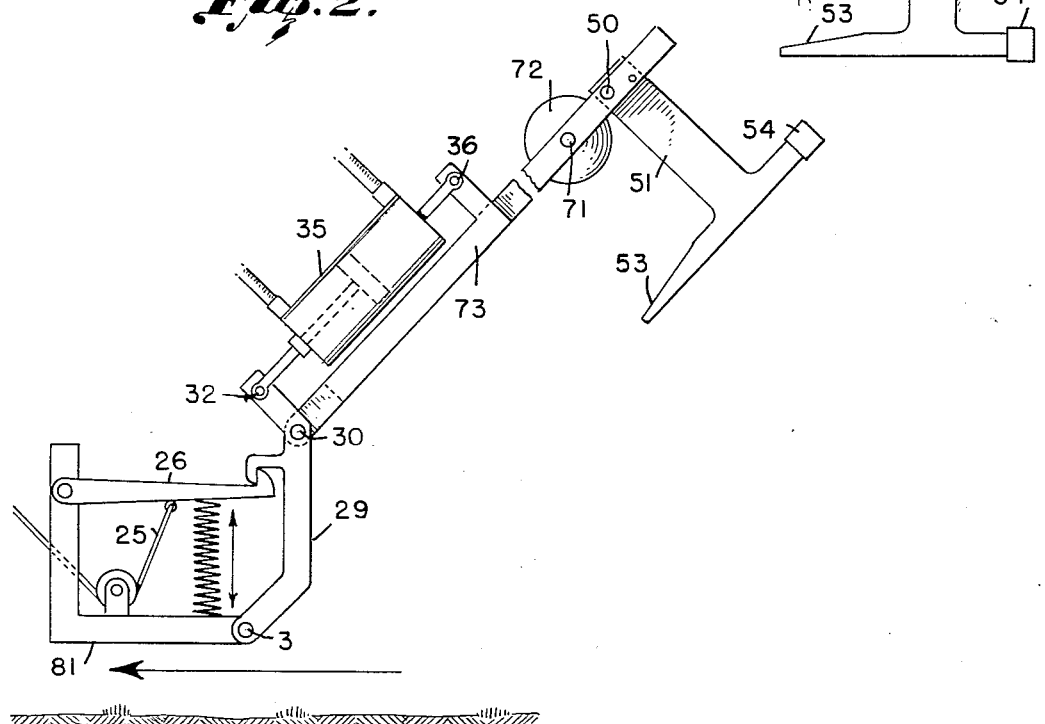
Figure 2 is a schematic representation of the machine in its latched and raised position for purposes of storage or transportation.

Continuing with a more detailed description of the invention, reference is primarily made to Figures 3 and 4, where 6 denotes the eye of the tractor drawbar. The pivot block 1 of the invention is coupled to the eye 6 by means of the tractor drawbar pin 5. Attached by pin 3 to the pivot block 1 is a pair of rotating parallel arms 29, 59, constituting a lever which is fabricated hollow to form a tube for the hydraulic oil and have a 45 degree offset on each end, and whose plane of rotation is vertical. The arms 29, 59 connect to the beam carriage 40 by means of two hollow spindles 79, 80 which are secured to the beam carriage 40. The arms 29, 59 rotate on the spindles 79, 80. A bolt 30 passes through the spindles 79, 80 and beam 73 retaining retaining arms 29, 59 on the spindles 79, 80 and securing the forward end 41 of the beam carriage 40 to the beam 73. The rearward end 38 of the beam carriage 40 is secured to the beam 73 by another bolt 39. The ends 38 and 41 are hollow, thus accommodating the beam 73, and permitting the latter to slide through them for purposes of adjustment. Connected to the top end of the arms 29, 59 is the movable cross head 33 of the hydraulic cylinder 35 by means of a pin 32. The arms 29, 59 and cross head 33 rotate on this pin. The beam 73 constitutes the parent part of the invention and has connected to it the arms 29, 59 and beam carriage 40 described above. A series of additional holes 42 to 47 inclusive are located in the beam 73 to allow for beam length adjustment; these holes accommodate bolts 30, 39. Additional holes may be provided, if desired, to allow for further shortening of beam 73. Connected to the beam 73 is the blade 51 which transmits the power to the mole point 53 and follower 54 which makes the mole channel or does the subsoiling under ground. The blade 51 is attached to the beam 73 by bolt 50. A sheer pin 52 passes through the blade 51 and beam 73 which acts as a safety device when an obstacle is encountered under ground. When an obstacle is encountered under ground by point 53 and blade 51 the shear pin 52 will be sheared off allowing the blade 51 to rotate upwardly on bolt 50 until it clears the obstacle.

A rolling coulter 72, Fig. 3, is secured to the beam 51 by means of pin 71. This coulter 72 is provided for cutting trash ahead of the mole blade 51.

The latch 24 is connected to the rear face of the tractor transmission case 81 by means of brackets 22, 57 which are bolted to the transmission case 81 with cap screws 75, 77, 76, 82. The latch 24 is connected to the brackets 22, 57 by pins 23, 58. The latch 24 is free to rotate on the pins 23, 58. The latch 24 has a point 93 extending to the rear in which is contained a notch 83 and a tongue 26. A pin 27 connects the tongue 26 to the point of the latch 93. A cross bar 28 is secured across the pair of arms 29, 59. This cross bar 28 engages in notch 83 of the latch 24. A rope 25 is attached to the tongue 26 and passes through pulley 8 to the seat of the tractor. A combination of telescoping tube 12 and rod 14, separated by a spring 13, one end attached to the latch by pin 17 through eye 15 and bolted by cap screw 16, and the other end attached to tractor rear plate 9 by pin 11 and eye 10 and cap screw 84, keeps the latch 24 elevated and spring 13 furnishing the power for latching. The rope 25 and tongue 26 rotating on pin 27 facilitate the unlatching.

The hydraulic control system of this invention is conventional and is not shown, and consists of a standard hydraulic pump mounted on the tractor, an oil reservoir, an operator's control valve with component pipe line to transmit the hydraulic pressure to the operator's control valve. The operator's control valve has four positions: up, down, hold and float. For the various position of the hand valve hydraulic pressure is applied or relieved from either side of the hydraulic piston 34 of the hydraulic cylinder 35. The hydraulic pressure transmits its power to the piston 34 of the hydraulic cylinder 35 and, by means of a crosshead 33 and a pin 32 power is transmitted to the arms 29, 59 of the machine, causing them to rotate on spindles 79, 80. The hydraulic pressure from the hand valve is transmitted or relieved by means of pipe lines to the pump, not shown, hydraulic hoses 7, 61, arms 29, 59, hydraulic hoses 31, 60 and pipe line 92 from either side of the piston 34 of hydraulic cylinder 35.

The hydraulic cylinder 35 is mounted on top beam 73 of the machine. The dead end of the cylinder 35 is fastened to the lugs 37 of the beam carriage 40 by means of the cylinder crosshead 70 and a bolt 36. The live end of piston 34 is fastened to the arms 29, 59 by means of the crosshead 33 and pin 32. Piston 34 is moved by the hydraulic pressure transmitted from the hand valve. The power from this piston 34 is transmitted to the arms 29, 59 by means of the crosshead 33 and pin 32, causing arms 29, 59 to rotate on the spindles 79, 80 of the front end 41 of the beam carriage 40.

In operation, the machine is unlatched from the suspended position shown in Figure 4, by pulling rope 25, in turn pulling down on the tongue 26 of the latch 24. The tongue 26 is moved in a down direction pivoting on pin 27 and by a prying action against the crossbar 28 of the arms 29, 59 which lowers the entire latch 24, depressing the spring 13. The latch 24 is lowered to a point where the notch 83 is below the crossbar 28 attached to the arms 29, 59. The arms 29, 59 are free to rotate on the pin 3 of the pivot block 1. After unlatching, the machine is in an operating position.

The operator places the hand valve in down position, allowing hydraulic pressure to be transmitted through the pipe line to hydraulic hose 61, arm 59, hydraulic hose 60 to the upper side of the piston 34 of the hydraulic cylinder 35. This pressure moves the piston 34 toward the rear of the machine. As the piston 34 moves rearward, a pull is exerted on the arms 29, 59, by the connecting crosshead 33 and pin 32 rotating rearward on the pivot block 1, pin 3 and the beam carriage spindles 79, 80. When the front end of the beam 73 is lowered the point 53 which is resting on the ground surface is pointed downward. When the tractor moves forward the point penetrates the earth, traveling in a downward path until beam 73 becomes level. The beam 73 becomes level when the downward and upward forces on the point 53 are in equilibrium. Schematic Figure 1 shows the machine in this operating position. The extent of the downward travel of the point 53 until the beam 73 levels off, is dependent on the length of the hydraulic block (distance between pins 32 and 36). When the desired depth is ascertained, the operator places the hand valve in hold position, which blocks the hydraulic pressure in either direction on the piston 34 of the hydraulic cylinder 35, keeping the machine operating at this depth. If the depth of moling or subsoiling is to be increased, the operator places the hand valve in down position, which allows hydraulic pressure to be transmitted through the previously described lines to the upper side of the hydraulic piston 34 of the cylinder 35, thus further shortening the hydraulic block (distance between pins 32 and 36). This shortening of the hydraulic block pitches the beam 73 downward and concurrently the point 53, which in turn increases the downward force, causing the point 53 to travel downward until the beam 73 levels off and the upward and downward forces are in equilibrium. In all cases where the description refers to the beam 73 leveling off and the upward and downward forces on the point 53 are in equilibrium, the hydraulic pressure to the hydraulic cylinder 35 must be static. This is accomplished by placing the hand valve in hold position. If the depth of moling or subsoiling is to be decreased, the operator places the hand valve in the up position, which allows hydraulic pressure to be transmitted through the previously described lines to the lower end of the piston 34 of hydraulic cylinder 35, which increases the length of the hydraulic block (distance between pins 32 and 36). This lengthening of the hydraulic block causes the beam 73 to point upward and concurrently the point 53, which in turn increases the upward force, causing the point to travel upward until the beam levels off and the upward and downward forces are in equilibrium. The machine is so designed that when the hydraulic block is at its maximum length, this upward pointing of the beam 73 and point 53 will continue until the point 53 runs completely out of the ground. Concurrently with the point running out of the ground, the arms 29, 59 pivot on the pivot block 1 and pin 3, and move forward until the latch 24 is engaged with the crossbar 28 of the arms 29, 59. In the latching action the point of the latch 93 moves between the arms 29, 59 and the sloping top of the latch point 93 slides below the crossbar 28 of the arms 29, 59. The inclined slope of the point 93 sliding on the crossbar 28 pushes the latch 24 downward compressing spring 13. The crossbar 28 moves over the inclined point 93 until the notch 83 is encountered, then the latch 24 is raised and engaged by the compressed spring 13. The arms are now secured to the tractor by the latch 24, the operator places the hand valve in the opposite down position, which transmits hydraulic pressure through the piping to the upper half of the piston 34 of hydraulic cylinder 35. This causes the hydraulic block to shorten (distance between pins 32 and 36), raising the point 53 clear of the ground. After raising the point 53 above the ground to the desired height, the hand valve is placed in hold position. The machine is now suspended for transporting. In order to keep the upward and downward forces in equilibrium of plows, mole drainers and subsoilers, there is a definite relation between the length of beam and the depth of operation. As the depth of operation increases the beam must lengthen if this equilibrium is maintained and the machine operates correctly. This invention accomplishes this requirement. As the depth of operation increases, the arms 29, 59 move rearward, pivoting on the pin 3 of the pivot block and the spindles 79, 80 of the beam carriage 40 increasing the effective length of the beam 73. The field of operation for equilibrium of forces mentioned above changes with soil texture and moisture. In order to compensate for changes in soil texture and moisture, a series of adjustment holes 42 to 47 inclusive is provided. In order to make the adjustments, the beam carriage 40 is moved forward or backward on the beam after removing the front bolt 30 and rear bolt 39. After aligning with the desired holes, the beam carriage 40 is secured by the bolts 30, 39.

I claim:

1. A mole drainage and subsoiling machine of a floating type capable of bridging small depressions in the soil without transmitting said depressions to the mole drain comprising: an elongated member of adjustable length having a blade and point at one end thereof; a lever rotatably mounted on the rear of a tractor, said lever being adapted to rotate in a vertical plane; the other end of the aforementioned elongated member being pivotally secured to a point on said lever; and means for moving said elongated member with respect to said lever.

2. A mole drainage and subsoiling machine of a floating type capable of bridging small depressions in the soil without transmitting said depressions to the mole drain comprising: an elongated beam of adjustable length having a blade and point at one end thereof; a lever rotatably mounted on the rear of a tractor, said lever being adapted to rotate in a vertical plane, the other end of the aforementioned beam being pivotally secured to a point on said lever; and hydraulic means for moving said beam with respect to said lever.

3. A mole drainage and subsoiling machine of a floating type capable of bridging small depressions in the soil without transmitting said depressions to the mole drain comprising: a lever pivotally secured by one end thereof to the rear of a tractor, a carriage pivotally secured by one end thereof to the other end of said lever; an elongated beam of adjustable length pivotally mounted on the lever by the same pivot as the carriage, said beam being adjustably secured at an intermediate point thereof to the other end of said carriage; and means secured to the lever and to the end of the carriage remote from the lever for moving the carriage and beam with respect to said lever.

4. A mole drainage and subsoiling machine of a floating type capable of bridging small depressions in the soil without transmitting such depressions to the mole drain comprising: a lever pivotally secured by one end thereof to the rear of a tractor and being rotatable in a vertical plane, said lever having additional pivot points at its other end and at a point intermediate the ends; a carriage pivotally secured by one end thereof to the intermediate point on said lever, said carriage also being rotatable in a vertical plane; an elongated beam of adjustable length pivotally mounted on the lever by the same pivot as the carriage, said beam having a blade and point at the end remote from the lever, said beam being adjustably secured at an intermediate point thereof to the end of said carriage remote from the lever; an hydraulic cylinder having one end pivotally secured to the end of the lever remote from the tractor, and having the other end pivotally secured to the carriage at the same end thereof secured to the intermediate point on the beam.

5. A machine as defined in claim 4 in which the carriage may be fixed at any predetermined position by means of pins engaging said carriage and beam in holes drilled in said carriage and beam.

6. A mole drainage and subsoiling machine of a floating type adapted to be drawn by a tractor and capable of bridging small depressions without imparting such depressions to the mole channel comprising: a tractor; a lever pivotally secured by one end thereof to the rear of the tractor, and being rotatable in a vertical plane, said lever having additional pivot points at its other end and at a point intermediate the ends; a carriage pivotally secured by one end thereof to the intermediate point on said lever, said carriage also being rotatable in a vertical plane; an elongated beam of adjustable length pivotally mounted on the lever by the same pivot as the carriage, said beam having a blade and point at the end remote from the lever and being rotatable in a vertical plane, said beam being adjustably secured at an intermediate point thereof to the end of the carriage remote from the lever; an hydraulic cylinder having one end pivotally secured to the end of the lever remote from the tractor, and having the other end pivotally secured to the carriage at the same end thereof secured to the intermediate point on the beam; the aforementioned lever being adapted to rotate upward about the point pivotally secured to the tractor when the piston of the cylinder is lengthened whereby the beam and blade are raised from their working position; latching means secured to rear of the tractor for holding said lever and beam in the raised position while in transportation; and means for unlatching said lever and beam to lower them for operation.

7. A machine as defined in claim 6 in which the lever is of hollow construction and serves as a conduit for the fluid for operating the hydraulic cylinder.

References Cited in the file of this patent

FOREIGN PATENTS 5,116 of 1878  Great Britain _____ June 10, 1879